United States Patent [19]
Haruki

[11] Patent Number: 5,430,483
[45] Date of Patent: Jul. 4, 1995

[54] AUTOMATIC FOCUSING APPARATUS HAVING AN IMPROVED APPARATUS FOR ACHIEVING AN IN-FOCUS LENS POSITION

[75] Inventor: Toshinobu Haruki, Osaka, Japan

[73] Assignee: Sanyo Electric Co., Ltd., Osaka, Japan

[21] Appl. No.: 19,237

[22] Filed: Feb. 18, 1993

[30] Foreign Application Priority Data

Feb. 19, 1992 [JP] Japan ................... 4-031954

[51] Int. Cl.$^6$ ............................ H04N 5/232
[52] U.S. Cl. .................... 348/349; 348/226; 348/354; 354/402
[58] Field of Search ............ 358/227, 213.15, 29 C; 354/400, 402; H04N 5/232, 5/225; 348/345, 349, 352, 354, 355, 361, 226

[56] References Cited

U.S. PATENT DOCUMENTS

| | | | |
|---|---|---|---|
| 4,320,417 | 3/1982 | Hanna et al. | 358/227 |
| 4,392,726 | 7/1983 | Kimura | 354/25 |
| 4,414,575 | 11/1983 | Yamamoto et al. | 358/225 |
| 4,531,158 | 7/1985 | Murakami et al. | 358/227 |
| 4,762,986 | 8/1988 | Suda et al. | 250/201 |
| 4,853,789 | 8/1989 | Murashima et al. | 358/227 |
| 4,922,346 | 5/1990 | Hidaka et al. | 358/227 |
| 4,967,280 | 10/1990 | Takuma et al. | 358/227 |
| 5,003,339 | 3/1991 | Kikuchi et al. | 354/402 |
| 5,101,277 | 3/1992 | Kanata | 358/227 |
| 5,204,741 | 4/1993 | Sakaguchi | 358/105 |
| 5,249,058 | 9/1993 | Murata et al. | 358/227 |

FOREIGN PATENT DOCUMENTS

| | | | |
|---|---|---|---|
| 0404952 | 7/1989 | European Pat. Off. | H04N 5/232 |
| 0437629 | 7/1990 | European Pat. Off. | H04N 5/232 |
| 61-070867 | 4/1986 | Japan | H04N 5/232 |
| 2093509 | 4/1990 | Japan | H04N 5/232 |
| 3060580 | 3/1991 | Japan | H04N 5/232 |
| 3117277 | 5/1991 | Japan | H04N 5/232 |

*Primary Examiner*—Joseph Mancuso
*Assistant Examiner*—Ngoc-yen Vu
*Attorney, Agent, or Firm*—Peter L. Michaelson

[57] ABSTRACT

The present invention relates to an automatic focusing apparatus provides an automatic focusing operation free from the effect of light illuminating an object and which operates in a short period of time and with a high reliability. The automatic focusing apparatus includes a focus lens, an image-sensing circuit, a focus motor, a focus evaluating value generating circuit, a focus motor control circuit for intermittently driving focus motor at a timing synchronized with a field cycle, a first subtractor for detecting change in the focus evaluating value during a prescribed time period T1 when focus motor is stopped, and a second subtractor for detecting change in the focus evaluating value during a prescribed time period T2 before and after the movement of focus motor. The focus motor control circuit compares the detection outputs of subtractors and reverses the rotation direction of focus motor if the output of first subtractor is larger than that of the second subtractor, and maintains the rotation direction of focus motor if the output of subtractor is smaller than that of the second substractor, while repeating intermittent driving of focus motor.

6 Claims, 8 Drawing Sheets

| STEP | MEMORY 20 | MEMORY 21 | MEMORY 22 | SUBTRACTOR 23 | SUBTRACTOR 24 | COMPARISON OF FOCUS EVALUATING VALUES |
|---|---|---|---|---|---|---|
| 1 | ①* | — | — | NOT NECESSARY | NOT NECESSARY | |
| 2 | ① | ②* | — | NOT NECESSARY | NOT NECESSARY | |
| 3 | ① | ② | ③* | ① − ② | ② − ③ | ● |
| 4 | ① | ④* | ③ | NOT NECESSARY | NOT NECESSARY | |
| 5 | ⑤* | ④ | ③ | ⑤ − ④ | ④ − ③ | ● |
| 6 | ⑤ | ⑥* | ③ | NOT NECESSARY | NOT NECESSARY | |
| 7 | ⑤ | ⑥ | ⑦* | ⑤ − ⑥ | ⑥ − ⑦ | ● |
| 8 | ⑤ | ⑧* | ⑦ | NOT NECESSARY | NOT NECESSARY | |
| 9 | ⑨* | ⑧ | ⑦ | ⑨ − ⑧ | ⑧ − ⑦ | ● |

\* INDICATES WRITING INTO MEMORY

AUTOMATIC FOCUSING APPARATUS HAVING AN IMPROVED APPARATUS FOR ACHIEVING AN IN-FOCUS LENS POSITION

BACKGROUND OF THE INVENTION

1. Field of the Invention

The present invention relates generally to automatic focusing apparatuses, and more specifically, to an automatic focusing apparatus for automatically matching the focus to an object in response to a video signal obtained from an image sensor, in an image sensing apparatus such as a video camera having an automatic focusing function.

2. Description of the Background Art

Conventionally, in an automatic focusing apparatus for use in an image sensing apparatus such as a video camera, an approach utilizing a video signal obtained from an image sensor itself for evaluation of the state of focus control has been developed. Such an approach is essentially free from parallax and possesses excellent characteristics that, for example, the focus can exactly be matched even if the depth of field is small and an object is located in the distance. Furthermore, according to this approach, a special sensor for automatic focusing does not have to be separately provided and therefore the apparatus is of a very simple mechanism.

As an example of such a focus control method utilizing a video signal, a so-called hill-climbing servo system has been conventionally known. An automatic focusing apparatus utilizing the hill-climbing servo system is disclosed, for example, in U.S. Pat. Nos. 4,922,346 and 5,003,339. Briefly stated, a high frequency component of a video signal from an image sensor is detected for every field as a focus evaluating value, the detected focus evaluating value is always compared with a focus evaluating value detected one field before, and the position of a focusing lens continues to be slightly vibrated so that the focus evaluating value always takes the maximum value.

Figure 7:
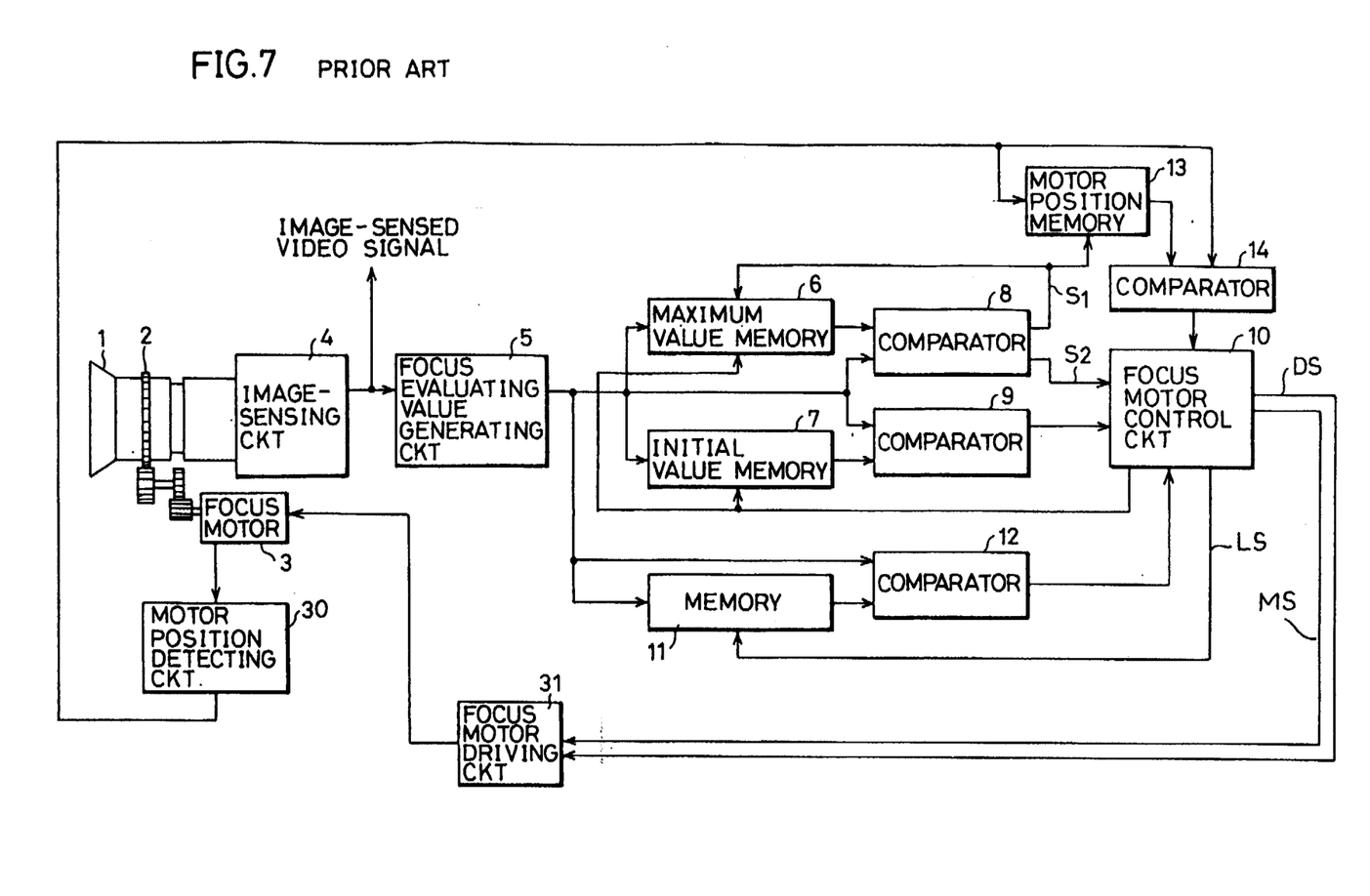
FIG. 7 is a block diagram schematically showing an example of a conventional automatic focusing apparatus.
Figure 8:
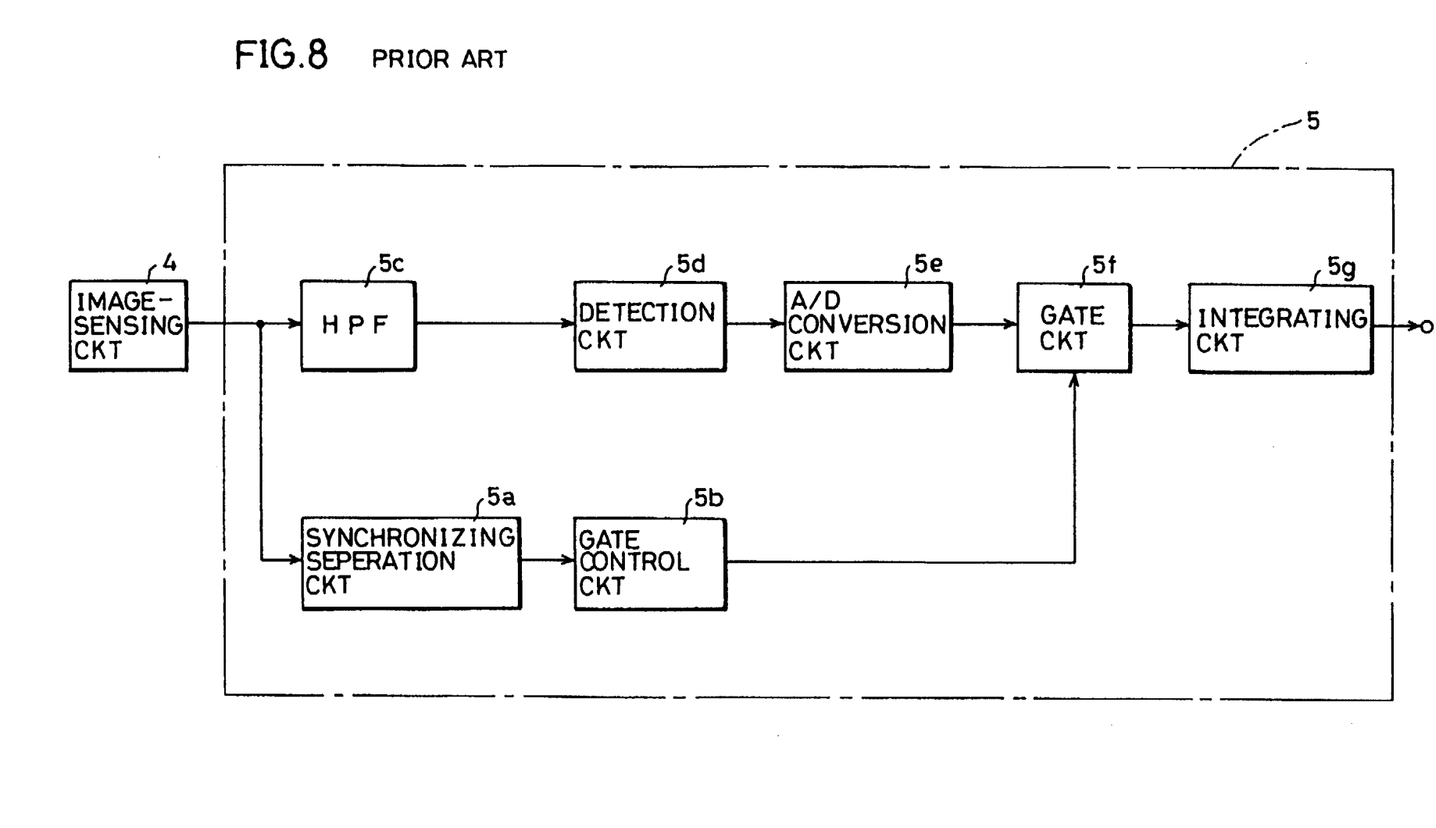
FIG. 8 is a block diagram showing in detail the circuit for generating a focus evaluating value shown in FIG. 7.

FIG. 7 is a block diagram schematically showing a conventional automatic focusing apparatus using such a hill-climbing servo system, and FIG. 8 is a block diagram showing in detail a focus evaluating value generation circuit in FIG. 7.

In FIG. 7, a video camera includes a focus ring 2 for advancing/withdrawing a focus lens 1, a focus motor 3 for driving focus ring 2, and an image-sensing circuit 4 including an image sensor such as a CCD (not shown). Advancing/withdrawing of focus lens 1 may be performed using a piezoelectric element instead of the motor, and the image sensor itself such as a CCD (not shown) may be advanced/withdrawn rather than focus lens 1.

An image formed by focus lens 1 on the plane of the image sensor is converted into an image sensed video signal by image sensing circuit 4, to be recorded on a magnetic recording medium which is not shown or externally output, and to be input to focus evaluating value generating circuit 7 as well.

Referring to FIG. 8 showing in detail focus evaluating value generating circuit 5, a luminance signal component in the video signal output from image sensing circuit 4 is applied to a synchronizing separation circuit 5a and a high-pass filter (HPF) 5c. A high frequency component of the video signal extracted by HPF 5c is amplitude-detected by a detection circuit 5d, and the detection output is applied to an A/D conversion circuit 5e. A/D conversion circuit 5e converts the applied detection output into a digital value for supply to a gate circuit 5f.

Meanwhile, synchronizing separation circuit 5a separates a vertical synchronizing signal and a horizontal synchronizing signal from the input luminance signal and applies the separated signals to a gate control circuit 5b. Gate control circuit 5b sets a rectangular sampling area in the center of the picture plane based on the input vertical and horizontal synchronizing signals and a fixed output from an oscillator (not shown).

Gate control circuit 5b applies to gate circuit 5f a signal for opening/closing the gate for every field so as to permit the passage of the output of A/D conversion circuit 5e only within this sampling area. It is noted that gate circuit 5f may be provided in any place in preceding stages up to an integrating circuit 5g which will be described later.

By the provision of gate circuit 5f, only the A/D conversion value of a high frequency component corresponding to the range of sampling area is applied to integrating circuit 5g. Integrating circuit 5g integrates the applied A/D conversion values for every field in a digital manner and supplies the resultant integration value as the present focus evaluating value.

Now, an operation immediately after automatic focus control is initiated will be described with reference to FIG. 7. Immediately after initiation of an automatic focusing operation, a focus evaluating value for the first 1 field output from focus evaluating value generating circuit 5 is applied to a maximum value memory 6 and an initial value memory 7 and held therein. Thereafter, a focus motor control circuit 10 generates a signal MS instructing on/off of focus motor 3 and a signal DS instructing the direction of rotation of focus motor 3 and applies the generated signals to a focus motor driving circuit 31, thereby rotating focus motor 3 in a prescribed direction. Then, a comparator 9 compares the initial focus evaluating value held in initial value memory 7 with the present focus evaluating value output from focus evaluating value generating circuit 5 to generate a comparison signal, and focus motor control circuit 10 responds thereto and performs an initialization for the direction of rotation of focus motor 3.

More specifically, focus motor control circuit 10 rotates focus motor 3 in the above-stated prescribed direction until comparator 9 generates a comparison output indicating "large" or "small". Then, if the comparison output is supplied from comparator 9 indicating that the present focus evaluating value is larger than the initial focus evaluating value held in initial memory 7 by more than a prescribed first threshold value, focus motor control circuit 10 maintains the above-stated prescribed rotation direction. Meanwhile, if the comparison output is supplied from comparator 9 indicating that the present focus evaluating value is smaller than the initial focus evaluating value by more than the first threshold value, focus motor control circuit 10 reverses the rotation direction of focus motor 3.

Thus, the initialization for the rotation direction of focus motor 3 is completed, and focus motor control circuit 10 then monitors the output of comparator 8. It is noted that during the period in which the difference between the initial focus evaluating value and the present focus evaluating value does not exceed the prescribed first threshold value, comparator 9 does not generate a comparison output indicating large or small, so that an erroneous operation due to noise in the focus evaluating values can be prevented.

Meanwhile, comparator 8 compares the largest prior focus evaluating value held in maximum value memory 6 with the present focus evaluating value output from focus evaluating value generating circuit 5, and outputs two kinds of comparison signals ($S_1$, $S_2$) indicating that the present focus evaluating value is larger than the focus evaluating value held in maximum value memory 6 (first mode) and that it is reduced by more than a prescribed second threshold value (second mode), respectively. If the present focus evaluating value is larger than the content of maximum value memory 6, the content of maximum value memory 6 is updated in response to the output ($S_1$) of comparator 8; thus, the current maximum value for the focus evaluating value is always held in maximum value memory 6.

A focus motor position signal is generated from a motor position detecting circuit 30 in response to the position of focus motor 3 driving focus ring 2 which supports focus lens 1, and the focus motor position signal is applied to a focus motor position memory 13. Focus motor position memory 13 is updated so as to always hold the focus motor position signal obtained when the focus evaluating value takes the maximum value, in response to the output of comparator 8.

Focus motor control circuit 10 monitors the output of comparator 8 while rotating focus motor 3 in the direction initialized based on the output of comparator 9 as described above. If the comparison output ($S_2$) of the second mode is obtained from comparator 8 indicating that the present focus evaluating value is reduced as compared with the maximum focus evaluating value by more than the above-stated second threshold value, focus motor control circuit 10 reverses the rotation direction of focus motor 3. The direction of rotating focus motor 3 is reversed for the first time only in response to the reduction by more than the prescribed second threshold value in order to prevent an erroneous operation due to noise in the focus evaluating values.

Thus, reversing the rotation direction of focus motor 3 changes the direction of the movement of focus lens 1 from the direction approaching the image sensor to the direction away therefrom or vice versa.

After focus motor 3 is reversed, the content of focus motor position memory 13 corresponding to the maximum focus evaluating value and the present focus motor position signal generated from focus motor position detecting circuit 30 are compared with each other at a comparator 14. If they match with each other, in other words if focus ring 2 returns to the position where the focus evaluating value takes the maximum value, focus motor control circuit 10 stops the rotation of focus motor 3. At the same time, focus motor control circuit 10 outputs a lens stop signal LS. Thus, a series of steps in the automatic focusing operation is completed.

A memory 11 and a comparator 12 are circuits for resuming an automatic focusing operation by focus motor control circuit 10 when the focus evaluating value is changed by more than a prescribed third threshold value at the time of the focus lens being stopped. More specifically, the focus evaluating value at the time when the focusing operation by focus motor control circuit 10 is completed and the lens stop signal LS is generated is held in memory 11. Then, the content of memory 11 and the present focus evaluating value output from focus evaluating value generating circuit 5 are compared with each other by comparator 12, and if the difference between them is larger than the prescribed third threshold value, an object changing signal is applied to focus motor control circuit 10, assuming that the object has been changed. Consequently, an automatic focusing operation by focus motor control circuit 10 is resumed, and a highly accurate automatic focusing operation following the change in the wide range of the object is realized.

The above-described automatic focusing apparatus is however still encountered with the following disadvantage.

When an automatic focusing operation is initiated, as described above, focus motor 3 is first rotated in a prescribed direction, in order to initialize the direction of rotation of focus motor 3. In this case, the abovedescribed first threshold value is preferably set large in order to prevent an erroneous operation due to the noises in the focus evaluating values and to secure the reliability of the operation. However, if the first threshold value is set large, the position of the focus lens is moved greatly away from the in-focus position when the initial rotation direction is opposite from the true direction of focusing.

A focus evaluating value input from focus evaluating value generating circuit 5 to comparator 9 has a delay from the time point of actual light incidence to the image sensor due to accumulation of optical charges in the image sensor and an integration for 1 field period in focus evaluating value generating circuit 5. Such time delay is usually 1.5 field period in total corresponding to addition of 1 field period necessary for integration of the output of the image sensor to 0.5 field period which is average for the periods for accumulating the optical charges caused by incident light in the image sensor at a certain time point. Therefore, if the focus evaluating value is monitored while rotating focus motor 3 as described above, a reversed movement of the focus lens from the in-focus position is further increased due to the above-described time delay from the time point of actual light incidence to the generation of the focus evaluating value.

These problems are not only encountered in initializing the in-focus direction, but also in detecting the in-focus position. More specifically, when the in-focus position is detected, the above-described second threshold value is also preferably set large in order to prevent an erroneous operation due to the noises in the focus evaluating values. If the second threshold is set large, however, the focus lens will go far beyond the in-focus position. The above-stated delay of the focus evaluating value accelerates this going beyond of the lens.

In order to prevent such reversed movement or going beyond of the position of a focus lens, an approach is suggested which includes driving a focus motor so as to make focus lens repeat a reciprocating rotational operation, detecting the phase of a modulated component for a focus evaluating value generated by the reciprocating operation of the focus lens with respect to the period of the above-stated reciprocating operation as a reference, and determining an in-focus direction based on the detected phase, for example, as described in Japanese Patent Laying-Open No. 58-215873 (H04N 5/26). Such an approach however requires the the focus lens be reciprocating many times in order to improve the reliability of the determination of the in-focus direction, and suffers from a disadvantage that it takes time for performing an automatic focusing operation even if the operation is initiated from a position relatively close to the in-focus position.

If light illuminating an object flickers like a fluorescent lamp, the focus evaluating value fluctuates in relation to the field frequency of a video signal. Accordingly, a method including a reciprocating operation of a focus lens always at a constant frequency as described above has a disadvantage that determination of the in-focus state can not be reliably secured. For example, assuming that a fluorescent lamp flickers at a flickering frequency of 100 Hz at a power supply frequency of 50 Hz, since the field frequency for a video signal of NTSC system is 60 Hz, the magnitude of the focus evaluating value, in other words a luminance on a reproduced picture plane periodically vibrates at a frequency of 20 Hz (in other words at a 3 field cycle) due to the deviation between the two frequencies. Accordingly, the periodic change of the focus evaluating value due to the reciprocating operation of the focus lens described above is affected by the oscillates of 20 Hz due to the flickering of the illuminating light, thus making it difficult to accurately determine the direction of focusing.

More specifically stated, unless the period of the reciprocating operation of the focus lens is integral multiples of or 1/integral multiples of 20 Hz, an actually produced focus evaluating value is sometimes increased when the focus lens is moved in the direction in which the focus evaluating value is supposed to be reduced, while an actually produced focus evaluating value is reduced when the lens is moved in the direction in which the focus evaluating value is supposed to be increased, and therefore the reliability of determination of the in-focus state can not be secured.

SUMMARY OF THE INVENTION

It is an object of the present invention to provide an automatic focusing apparatus permitting an automatic focusing operation in a short period of time and with a high reliability.

In brief, the present invention concerns an automatic focusing apparatus performing an automatic matching of the focus to an object in response to a video signal obtained from an image sensing device having a focus lens and an image sensor. The inventive apparatus includes a relative position changing device for changing the relative position of the focus lens to the image sensor in the direction of optical axis, a focus evaluating value detecting circuit for detecting a high frequency component level of the video signal obtained from the image sensing device for every fixed period, converting the detected level into a focus evaluating value which takes the maximum value in an in-focus position and sequentially supplying the value, a control circuit for controlling the relative position changing device to move the relative position of the focus lens to the in-focus position, while performing an intermittent operation formed of stopping and moving the relative position of the focus lens in a timing synchronized with the field of the video signal, a first difference detecting circuit for detecting twice at a first prescribed time interval the focus evaluating values based on the video signals during the time period when the relative position of the focus lens is stopped and calculating the difference therebetween, and a second difference detecting circuit for detecting twice at second prescribed time interval the focus evaluating values based on the video signals before and after the movement of the relative position of the focus lens and calculating the difference therebetween. The control circuit compares the outputs of the first and second difference detecting circuits and controls the relative position changing device to repeat the intermittent operation by reversing the moving direction of the relative position of the focus lens when the output of the first difference detecting circuit is larger than the output of the second difference detecting circuit and maintaining the relative position of the focus lens when the output of the first difference detecting circuit is smaller than the output of the second difference detecting circuit.

According to another aspect of the present invention, the automatic focusing apparatus further includes a circuit for detecting the frequency of the flickering of light illuminating an object, and the control circuit decides first and second time intervals based on the relation between the detected frequency of the flickering and the field frequency of the video signal.

In the automatic focusing apparatus according to the present invention, since the change of the focus evaluating value is detected and determination of focusing is performed while executing the intermittent operation formed of stopping and moving of the focus lens, the focus lens can be restrained from moving backwards from and going beyond the in-focus position, so that the lens can reach the in-focus position in a shorter period of time than a conventional method of focusing utilizing a reciprocating operation.

Furthermore, since the automatic focusing apparatus according to the present invention decides time intervals for detecting the focus evaluating values based on the relation between the flickering frequency of illuminating light and the field frequency of the video signal, the effect on the in-focus determination caused by the periodic change in the focus evaluating value due to the difference between the frequencies can be canceled, thus improving the reliability of the in-focus determination.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
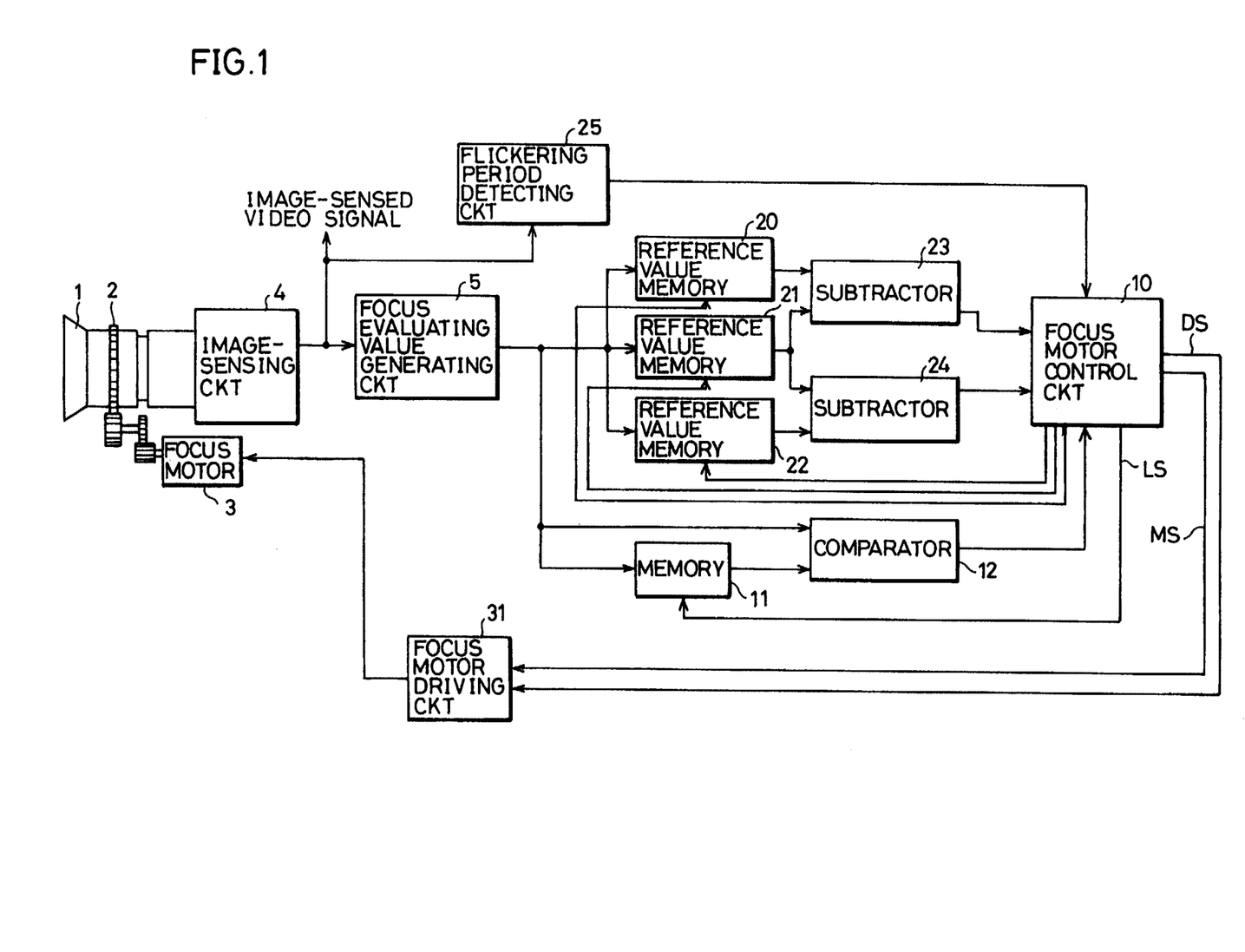
FIG. 1 is a block diagram schematically showing an automatic focusing apparatus in accordance with one embodiment of the invention.

FIG. 1 is a block diagram schematically showing an automatic focusing apparatus in accordance with one embodiment of the invention. The embodiment shown in FIG. 1 is substantially identical to the conventional automatic focusing apparatus shown in FIG. 7 except for the following differences, and description will not be provided on portions in common.

More specifically, a focus motor 3 is in a stop state immediately after an automatic focusing operation is initiated, and a focus evaluating value output from a focus evaluating value generating circuit 5 is provided to reference value memories 20, 21, and 22. A focus motor control circuit 10 first gives an instruction to reference value memory 20 and stores (writes) the focus evaluating value at that time into memory 20. Focus motor control circuit 10 then counts a prescribed time period T1, gives an instruction to reference value memory 21 when T1 elapses and stores the focus evaluating value at that latter time into memory 21. A subtractor 23 calculates the difference between the focus evaluating values held in reference value memories 20 and 21 and provides the calculated difference to focus motor control circuit 10. Immediately before the above-stated prescribed time period T1 elapses, focus motor control circuit 10 intermittently rotates focus motor 3 by a fixed amount in a prescribed direction.

Then, focus motor control circuit 10 counts a prescribed time period T2 from the lapse of the above-stated period T1, gives an instruction to reference value memory 22 when T2 elapses, and stores the focus evaluating value at that time into memory 22. A subtractor 24 calculates the difference between the focus evaluating values held in reference value memories 21 and 22 and provides the calculated difference to focus motor control circuit 10. Thereafter, counting of the above-stated periods T1 and T2 and detection of the difference between the focus evaluating values are repeated, while the intermittent operation of focus motor 3 at the end of the period T1 is also repeated.

Focus motor control circuit 10 compares the two differences between the focus evaluating values output from subtractors 23 and 24. If the output of subtractor 23, in other words the change of the focus evaluating value during the period T1, is larger than the output of subtractor 24, in other words the change of the focus evaluating value during the period T2, the focus motor control circuit reverses the direction of rotation upon the intermittent operation of the focus motor in the next period T1, and conversely, maintains the direction of rotation of focus motor if the output of subtractor 24 is larger than the output of subtractor 23.

Meanwhile, a video signal output from image sensing circuit 4 is applied to a flickering period detecting circuit 25, which produces data for detecting the period or frequency of light illuminating an object based on the applied video signal and applies the produced data to focus motor control circuit 10. Focus motor control circuit 10 decides the above-stated prescribed time periods T1 and T2 based on the detected data from flickering period detecting circuit 25. In this embodiment, the periods T1 and T2 are each initially set for a 3 field period but are subsequently altered as directed by the flickering period detecting circuit 25.

Figure 2:
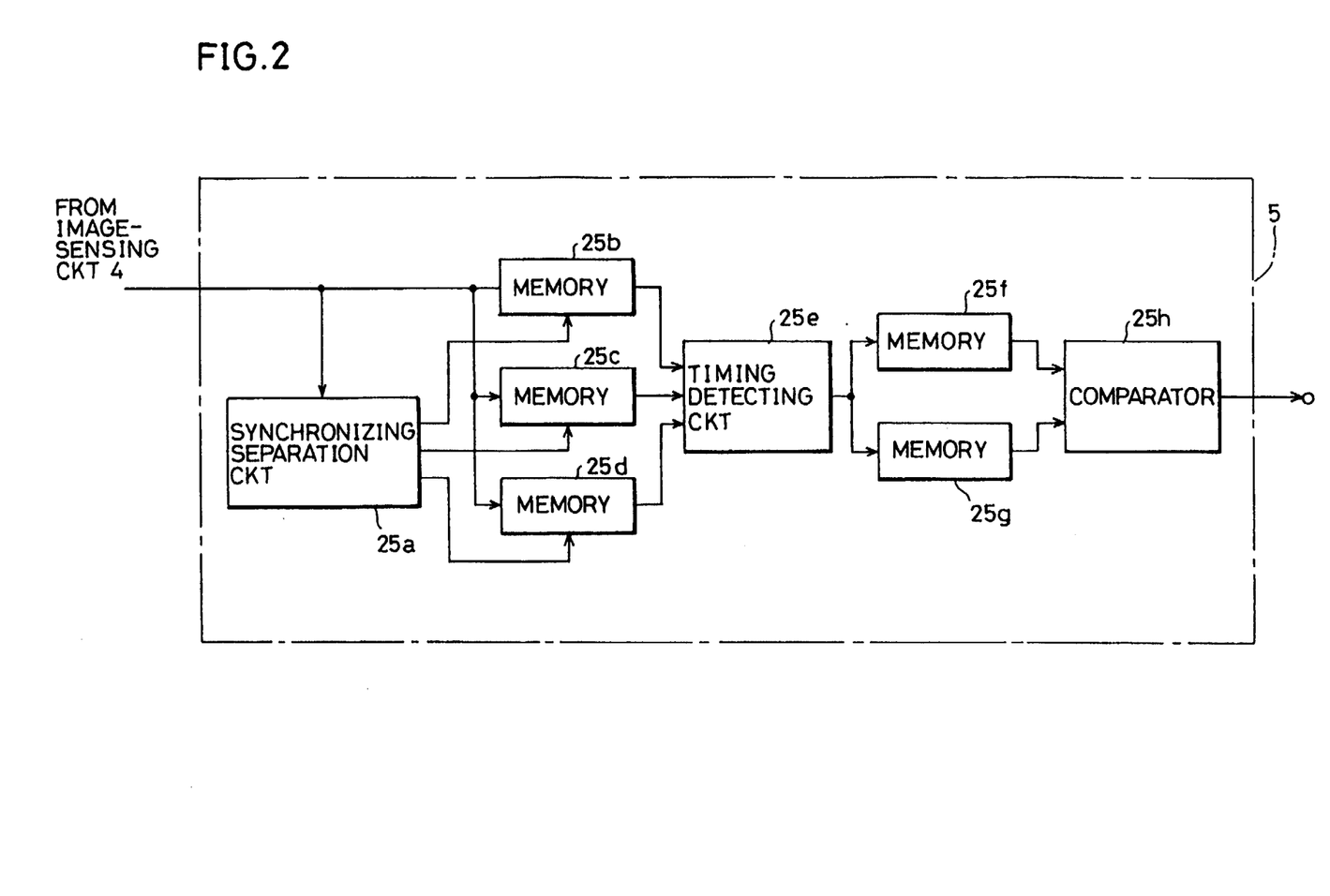
FIG. 2 is a block diagram showing in detail the circuit for detecting a flickering frequency shown in FIG. 1.

FIG. 2 is a block diagram showing in detail flickering period detecting circuit 25. Referring to FIG. 2, an image sensed video signal supplied from image-sensing circuit 4 shown in FIG. 1 is applied to a synchronizing separation circuit 25a, and memories 25b, 25c, and 25d. Synchronizing separation circuit 25a extracts a vertical synchronizing signal from the image sensed video signal, generates a sampling signal at a field period (60 Hz), and applies the signal to memories 25b, 25c, and 25d. Thus, the image-sensed video signal is sampled at the field period and the results of sampling for the first three times (corresponding to 3 fields) are held in memories 25b, 25c, and 25d, respectively.

A timing detecting circuit 25e compares the data held in these three memories 25b, 25c, and 25d, and detects the timing when the maximum value is taken among them, in other words the M-th (M: integer from 1–3) sampling taking the maximum value among the three samplings, and stores the data M in a memory 25f. The results of another subsequent three samplings (corresponding to 3 fields) are held in memories 25b, 25c, and 25d, respectively, and timing detecting circuit 25e compares the data held in these three memories, detects the timing when the maximum value is taken among them, in other words the N-th (N: integer from 1–3) sampling taking the maximum value among the three samplings, and stores the data N in a memory 25g.

A comparator 25h compares data M and N respectively stored in memories 25f and 25g with each other and provides the result of the comparison to focus motor control circuit 10. Such comparison of data for every 3 field basis is serially performed, and if M and N have the same value for each successive comparison, focus motor control circuit 10 determines that there exists a periodic change of a 3 field period (20 Hz) in the focus evaluating value. More specifically, it is determined that the object is under illuminating light flickering at a frequency of 100 Hz, and focus motor control circuit 10 sets each of the above-stated periods T1 and T2 for a 3 field time period in order to eliminate the effect of the beat of the focus evaluating value.

Figure 3:
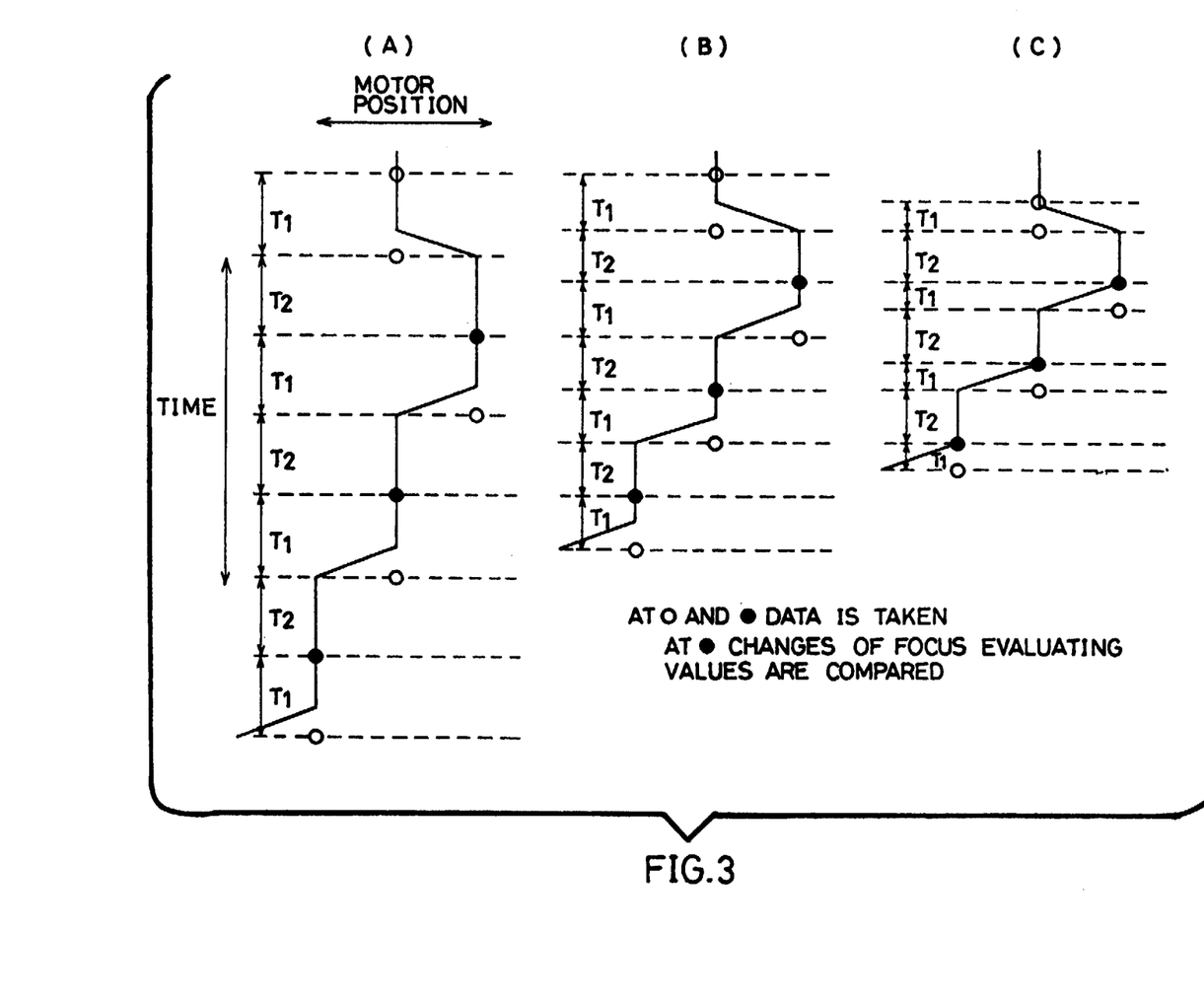
FIGS. 3 and 4 are representation for use in schematic illustration of an operation of an embodiment of the invention.
Figure 4:
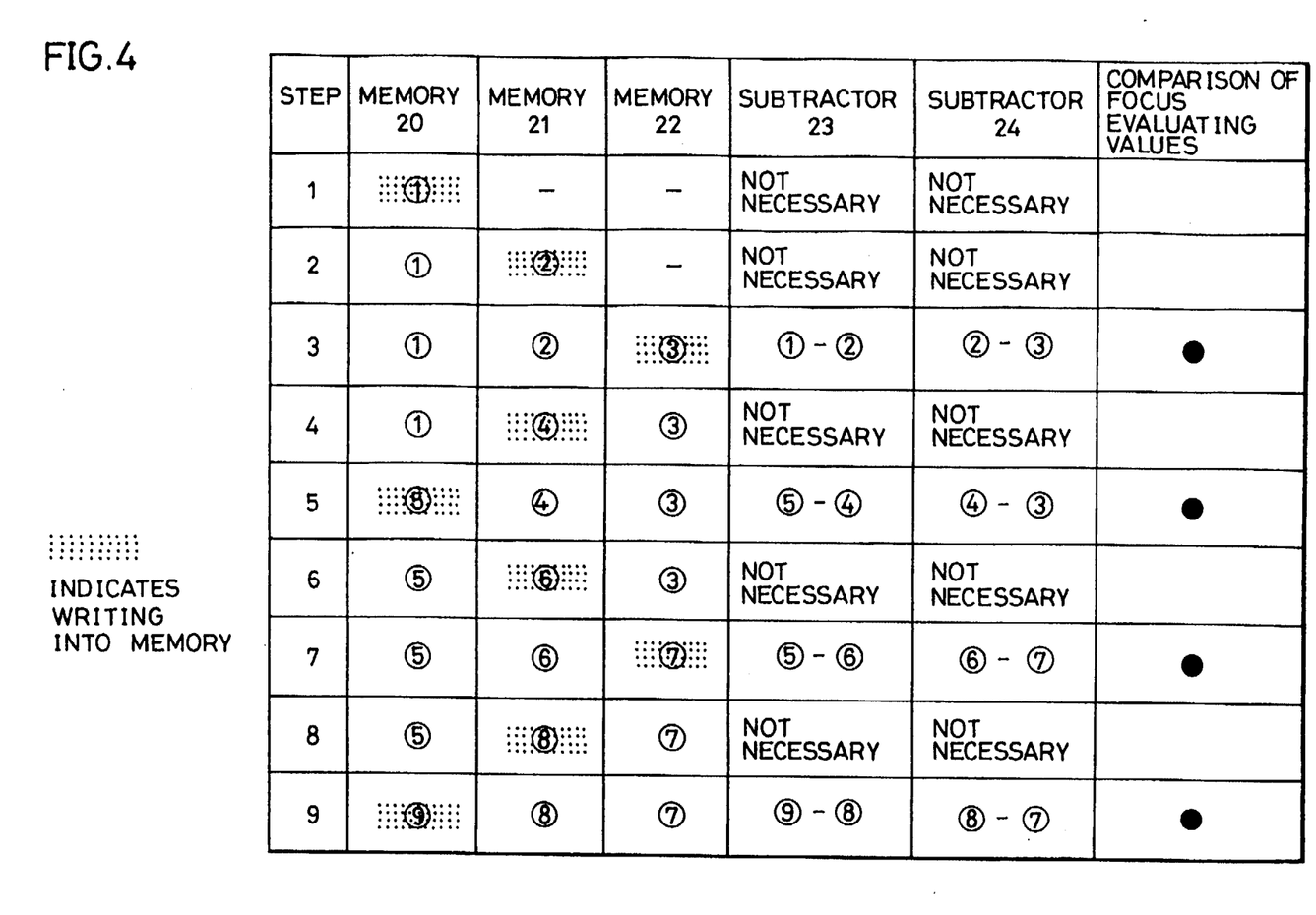

Now, in FIG. 3, graphs (A), (B), and (C) are graphical representations each for illustrating an operation of graphs the above-stated embodiment, and in each of (A), (B), and (C), abscissa represents the motor position (or the position of the focus lens), while the ordinate represents the passage of time. In each representation, ○ and ● each represents a timing in which the focus evaluating value at that time is stored (written) within one of memories 20 through 22 in FIG. 1, and especially ● represents a timing in which comparison of the difference components between the focus evaluating values output from subtractors 23 and 24 is performed. FIG. 4 schematically shows such operation in steps.

In FIG. 3, graph (A) shows an operation when the time periods T1 and T2 are each initially set for 3 field periods as described above. An operation of one embodiment of the invention will be described in conjunction with graph (A) in FIG. 3 and FIG. 4. When counting of the time period T1 is initiated (step 1), a sampled value ① of the focus evaluating value at that time is written into reference value memory 20 ○, and at the lapse of T1 (step 2) a sampled value of ② the focus evaluating value at that time is written into reference value memory 21 ○. Immediately before the lapse of the period T1, focus motor 3 is rotated by a fixed amount in a prescribed direction, but as in the description of the conventional technique, since the focus evaluating value is delayed by 1.5 field period from actual light incidence, the focus evaluating values at both ends of the time period T1 held in memories 20 and 21 are both actually focus evaluating values when the focus motor is stopped. Accordingly, the output of subtractor 23 in the next step, in other words the difference ①−② between these two focus evaluating values represents the amount of change in the focus evaluating value during the period in which the focus motor is stopped.

Then, at the lapse of the time period T2 (step 3), a sampled value ③ of the focus evaluating value at that time is written into reference memory 22 (●). The focus evaluating value is with a delay of 1.5 field period as described above, the focus evaluating values held in memories 21 and 22 are actually focus evaluating values at both ends of time period T2 during which the focus motor is rotated. Therefore, the output of subtractor 24, in other words the difference ②−③ between these two focus evaluating values represents the amount of change in the focus evaluating value due to the movement of the focus lens. In the timing (●) at the lapse of the time period T2, focus motor control circuit 10 compares the outputs of subtractors 23 and 24.

Then, at the lapse of the next time period T1 (step 4), a sampled value ④ of the focus evaluating value at that time is written into reference memory 21 (◉). Accordingly, the output of subtractor 24 in the next step, in other words the difference ④−③ between these two focus evaluating values represents the amount of change in the focus evaluating value during the period in which the focus motor is stopped.

Then, at the lapse of the next time period T2 (step 5), a sampled value ⑤ of the focus evaluating value at that time is written into reference memory 20 (●). Accordingly, the output of subtractor 23, in other words the difference ⑤−④ between these two focus evaluating values represents the amount of change in the focus evaluating value due to the movement of the focus lens. In the timing (●) at the lapse of the time period T2, focus motor control circuit 10 compares the output of subtractors 23 and 24. The above described operation of these time periods T1 and T2 shown in FIG. 4 will be continuously repeated.

The timing for the intermittent rotation of focus motor 3 is so decided that the time point 1.5 field before from the timing in which data is taken into each memory (○) and (●) in the figure), in other words an actual timing for light incidence, does not come into the time period of focus motor rotation, considering the delay of 1.5 field period of the focus evaluating value as described above.

As described above, if the amount of change in the focus evaluating value during the stop period is larger than the amount of change in the focus evaluating value due to the movement of the focus lens, the rotation direction of the focus motor is reversed, and in the opposite case, the intermittent operation of the focus motor is continued while maintaining the rotation direction. If the rotation direction of the motor is reversed for every other time, since this indicates that the focus evaluating value is reduced by moving the focus lens in any of the directions, it is considered that the focus evaluating value has reached the maximum value while the focus lens is moved forward and backward. Accordingly, in such a case, focus motor control circuit 10 determines that the position of the focus lens has reached the in-focus position to complete the automatic focusing operation.

It is noted that if the frequency of the flickering of the illuminating light is detected to be 120 Hz by flickering period detecting circuit 25, it is considered that a periodic change of 2 field period (30 Hz) is produced in the focus evaluating value in view of a field frequency of 60 Hz. Focus motor control circuit 10 sets each of the above-stated time periods T1 and T2 for a 2 field period, in order to eliminate the effect of the beat of the focus evaluating value.

As illustrated by graph (C) in FIG. 3, the period T1 can be set for a 1 field period and the period T2 for a 2 field period in order to reduce the period of the intermittent operation. Particularly if the focus evaluating value increases and decreases due to change in the state of an object, the effect of the change of the object upon the focus evaluating value can be eliminated by setting T1 and T2 to such values that the intermittent operation of the focus motor can be performed at a sufficiently shorter period than such change.

Figure 5:
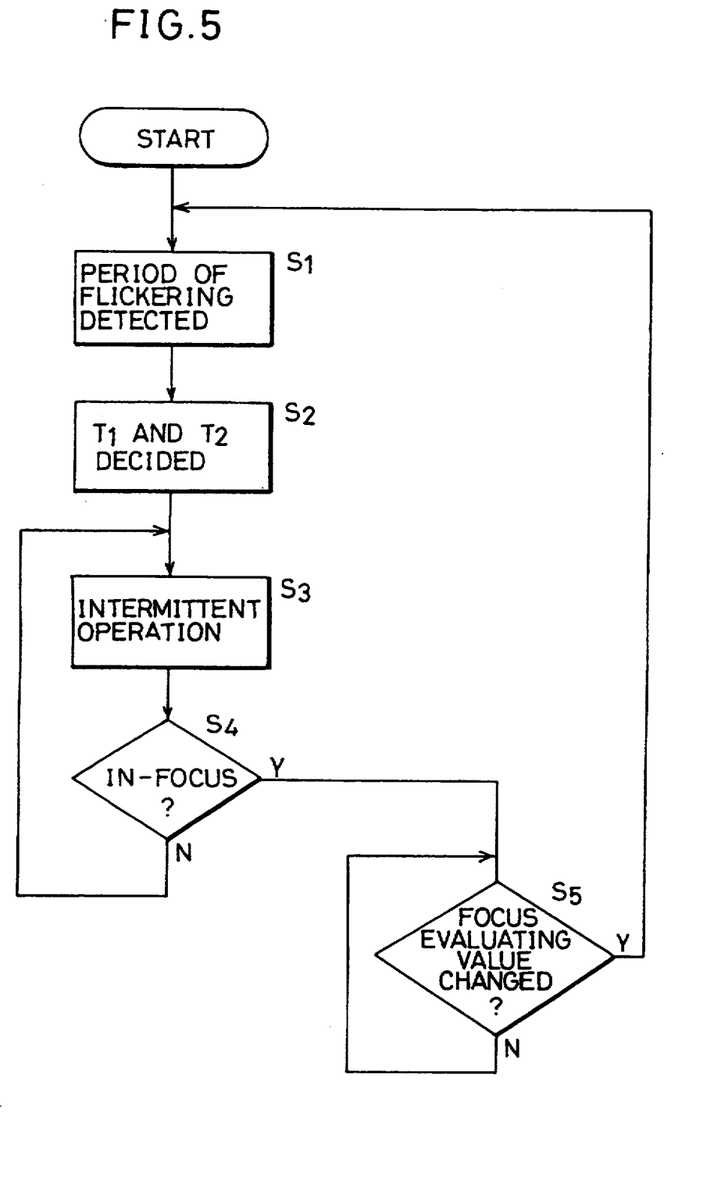
FIG. 5 is a flow chart for use in illustration of an operation of one embodiment of the invention.

These operations can readily be achieved in a software manner utilizing a microcomputer. FIG. 5 is a flow chart showing an operation of such an embodiment.

Referring to FIG. 5, the period of the flickering of illuminating light is detected based on an image-sensed video signal (step S1), and time periods T1 and T2 are decided based on the result (step S2). An intermittent operation of focus motor 3 as illustrated in FIGS. 3 and 4 is repeated (steps S3 and S4), and when it is determined that the in-focus position has been reached (step S4), the automatic focusing operation is once stopped and the program proceeds to an operation of monitoring change in the focus evaluating value (step S5). If change in the focus evaluating value is detected, it is determined that an object has changed (step S5), and the program returns to step S1 and the intermittent operation of the focus motor is started again from the beginning.

Figure 6:
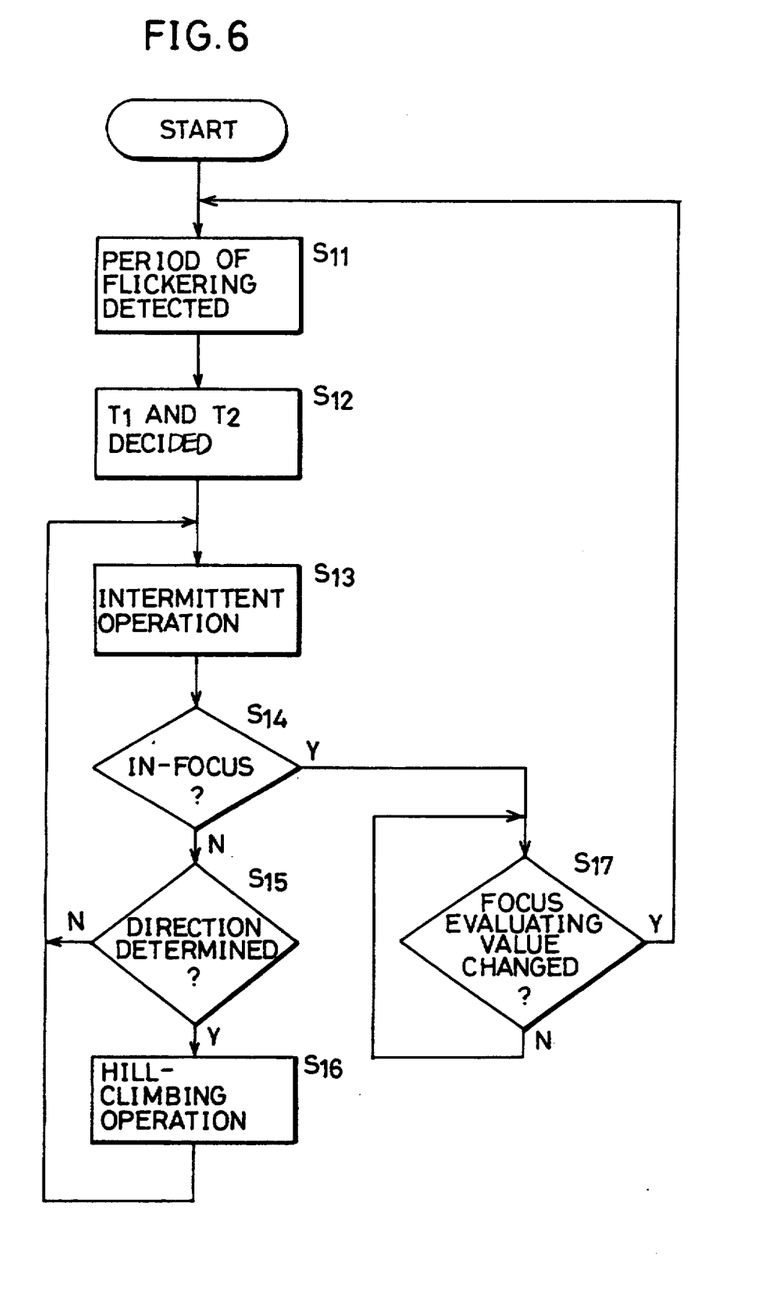
FIG. 6 is a flow chart for use in illustration of an operation of another embodiment of the invention.

FIG. 6 is a flow chart showing as another embodiment an application of the intermittent operation in accordance with the embodiment of the invention to determination of the direction of focusing when an automatic focusing operation is initiated, confirmation of the in-focus position, and reactivation when an object changes after the in-focus state has been reached.

Referring to FIG. 6, the cycle of the flickering of illuminating light is detected based on an image-sensed video signal (step S11), and time periods T1 and T2 are decided based on the result (step S12). The intermittent operation of focus motor 3 as illustrated in FIGS. 3 and 4 is repeatedly performed until the direction of focusing is decided (steps S13, S14, and S15), and if the rotation direction of focus motor 3 by the intermittent operation is maintained in the same one direction for a prescribed time period, it is determined that the in-focus position is in that direction. When the in-focus direction is thus determined (step S15), the in-focus position is detected by executing a usual hill-climbing operation (step S16), and if it is determined by an intermittent operation that the true in-focus position has been reached (steps S13 and S14), the automatic focusing operation is once stopped and the program proceeds to an operation of monitoring change in the focus evaluating value (step S17). If change in the focus evaluating value is detected, it is determined that the object has changed (step S17), and the program returns to step S11, thereby starting all over the intermittent operation of the focus motor.

As in the foregoing, according to the embodiment of the present invention, the focus lens can be restrained from moving backwards or going beyond the in-focus position, thereby permitting the in-focus position to be reached in a reduced time period than a conventional method of focusing utilizing a reciprocating operation.

Furthermore, the effect of periodic change in the focus evaluating value due to the difference between the frequencies upon determination of the in-focus state can be eliminated, thereby improving the reliability of determination of the in-focus state.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic focusing apparatus for automatically matching a focus to an object based on a image signal obtained from image-sensing means, the image sensor means having a focus lens and an image sensor, the apparatus comprising:

relative position changing means for changing a relative position of said focus lens with respect to said image sensor in the direction of an optical axis, the image sensor and the focus lens aligned along the optical axis;

focus evaluating value detecting means, operative in response to said image signal, for periodically detecting an amplitude of a high frequency component of the image signal and for providing, in response to the detected amplitude, a focus evaluating value which attains a maximum value in an in-focus lens position so as to provide a corresponding one of a plurality of focus evaluating values;

means for controlling said relative position changing means to move the relative position of said focus lens to the in-focus lens position, wherein the controlling means operates the relative position changing means so as to move the focus lens repetitively on an intermittent basis along the optical axis in synchronization with a period of a field of said image signal;

first difference detection means, responsive during a first prescribed time interval, for detecting a first pair of said focus evaluating values, and for calculating a first difference between the first pair of focus evaluating values, wherein first and second ones of the focus evaluating values in said first pair occur during the first time interval when movement of said focus lens is stopped;

second difference detection means, responsive during a second prescribed time interval, for detecting a second pair of said focus evaluating values, and for calculating a second difference between the second pair of focus evaluating values, wherein first and second ones of the focus evaluating values of the second pair respectively occur before and after the focus lens has intermittently moved during the second time interval, said second time interval occurring after the first time interval has ended; and wherein said controlling means compares the first and second differences and controls said relative position changing means to reverse a direction of motion of said focus lens when said first difference is larger than said second difference and to maintain the direction of motion of said focus lens when said first difference is smaller than said second difference.

2. An automatic focusing apparatus according to claim 1, wherein detection, by said first difference detection means, of the second focus evaluating value in said first pair serves as detection, by said second difference detection means, of the first focus evaluating value in said second pair.

3. An automatic focusing apparatus according to claim 1, further comprising means for detecting, based upon variations in said image signal, a frequency at which light illuminating said object is flickering, wherein said controlling means sets the length of said first and second time intervals based on a relation between said detected frequency of the flickering and a field frequency of said image signal.

4. An automatic focusing apparatus according to claim 3, wherein said flickering frequency detection means comprises:

a plurality of memories, each of said memories for sequentially sampling said image signal for every field and storing a corresponding sampled value of said image signal so as to define a plurality of sampled values stored within said memories;

means, responsive to said memories, for detecting a particular one of said plurality of fields wherein the particular one field has associated therewith a maximum value from among the sampled values then stored in said plurality of memories and for generating a result indicative of said one particular field;

means for specifying the frequency of flickering by comparing a plurality of successive results produced by said field detecting means.

5. An automatic focusing apparatus according to claim 1, wherein said focus evaluating value detecting means comprises:

filter means for extracting the high frequency component of said image signal so as to provide an extracted component;

detection means, responsive to the extracted component, for detecting the amplitude of the high frequency component so as to provide a detected amplitude;

analog-to-digital conversion means for converting the detected amplitude into a digital output;

synchronizing signal separation means for separating a vertical synchronizing signal and a horizontal synchronizing signal from said image signal;

gate means, responsive to said vertical and horizontal synchronizing signals, for periodically passing the digital temporally occurring within a sampling area defined by said vertical and horizontal synchronizing signals, and integration means for integrating the digital output passed through said gate means so as to yield the corresponding focus evaluating value.

6. An automatic focusing apparatus according to claim 1, further comprising:

object change detection means for detecting a change in the object based on change in said corresponding focus evaluating value after the relative position of said focus lens has attained the in-focus position and while the focus lens remains at the in-focus position; and wherein said controlling means, responsive to said object change detection means, causes said relative position changing means to move said focus lens in response to a detected change in the object.

* * * * *